United States Patent [19]
Tauern et al.

[11] 3,866,012
[45] Feb. 11, 1975

[54] METHOD AND APPARATUS FOR ELECTRICAL STUD WELDING

[75] Inventors: Dankmar Tauern, Triesenberg; Rainer Wild, Schaan; Karl-Max Harder, Vaduz, all of Liechtenstein

[73] Assignee: Hilti Aktiengesellschaft, Schaan, Liechtenstein

[22] Filed: June 29, 1973

[21] Appl. No.: 374,965

[30] Foreign Application Priority Data
June 30, 1972 Germany.............................. 2232269

[52] U.S. Cl........................... 219/99, 219/113, 320/1
[51] Int. Cl............................................. B23k 11/24
[58] Field of Search............. 219/98, 99, 113; 320/1

[56] References Cited
UNITED STATES PATENTS

| | | | |
|---|---|---|---|
| 2,453,053 | 11/1948 | Wannamaker.......................... | 320/1 |
| 2,507,022 | 5/1950 | Languepin........................... | 219/113 |
| 2,938,105 | 5/1960 | Kelemen et al....................... | 219/98 |
| 3,174,091 | 3/1965 | Ferranto........................... | 219/113 X |
| 3,564,191 | 2/1971 | Elzer et al......................... | 219/113 X |

Primary Examiner—J. V. Truhe
Assistant Examiner—N. D. Herkamp
Attorney, Agent, or Firm—Toren, McGeady and Stanger

[57] ABSTRACT

In the disclosed method and apparatus for electrical welding of bolts or studs, single means simultaneously set the capacitor voltage and capacitance values to accomplish the welding function. The voltage and capacitance values are predetermined in accordance with the cross-sectional areas of the flanges and studs to be welded. Supplemental means increase or decrease the basic capacitor voltage and capacitance values by some smaller amount in accordance with secondary welding factors to be considered.

20 Claims, 4 Drawing Figures

C5-1 = .5 Cmax
C5-2 = .3 Cmax
C5-3 = .1 Cmax
C5-4 = .1 Cmax

METHOD AND APPARATUS FOR ELECTRICAL STUD WELDING

BACKGROUND OF THE INVENTION

This invention relates to a method and apparatus for the electrical welding of bolts or studs by discharging a capacitor.

Generally stud welding machines are equipped so that welding elements, such as the flanges of welding studs of various diameters, for instance, M3 thread and 4 mm flange diameter up to M8 thread and 10 mm flange diameter can be welded to a target material. The flange diameters of the various thread sized bolts (M3 to M8) are standard.

Naturally, a bolt with a M3 thread and a 4 mm flange diameter cannot be welded with the same amount of energy consumed as a bolt with a M8 thread and a 10 mm flange diameter, because the ratio of their welding cross-sections = 1:6. Conventionally, this welding operation utilizes a capacitor discharge for causing energy stored by the capacitor prior to the welding operation to appear in the weld areas.

It has been shown that the best welding results require the welding energy to be selected not only by varying the capacitance of a capacitor bank used with the discharge bolt welding machines. Rather, improved performance can be obtained by adjusting the capacitance and charging voltage of the capacitor bank controlling the energy output applied to the weld. The optimum capacitance and charging voltage values do not depend only upon primary factors such as the cross-sections. They also depend upon the material of the welding elements, such as the bolts or studs and upon the surface quality in the areas to be welded together. These are secondary factors.

Manufacturers' operating manuals conventionally state which charging voltage and capacitance values of the capacitor bank should be chosen for the respective dimensions of the elements to be welded so as to obtain the best welding results. Beyond this, improved welding action taking into account the above-mentioned secondary factors may also be desired. It is easy to see that an operating manual, which must be consulted before each welding operation, is cumbersome. It gives rise to errors in operating the machine, because the operators do not always consult the manual, and if consulted, do not always read them correctly.

Some types of capacitor discharge stud welding machines offer only one alternative for setting the charging voltage of the capacitor bank. For this purpose, a knob can set the voltage which can at the same time read from a suitable measuring instrument. It is, of course, not possible to achieve optimum welding results with such equipment, since the capacitance cannot be adjusted. In addition, operating errors can easily occur when operating the voltage knob.

Other stud welding machines have, in place of the voltage adjustment knob, a stepping switch or a row of buttons with each step of the switch or each one of the buttons corresponding to a specific size of the elements to be welded. Generally, the steps of the switch or the buttons of the button row are previously lettered with the sizes (such as M3 to M8) of the elements to be welded. To take into account the above mentioned secondary controlling factors, the charging voltage may also be varied within certain limits, such as by a knob. A disadvantage inherent in all of these welding machines is that only the charging voltage can be varied and that, once the charging voltage has been set to account for the secondary influencing factors, the previously set charging voltage achieved by the additional knob controls are often left untouched, thereby causing the welding of elements of another size at an incorrect voltage level.

There are known capacitor discharge bolt welding machines, which, beside permitting adjustability of the charging voltage of the capacitor bank, also permit additional or supplemental capacitors to be added to or substracted from the capacitor bank. However, this addition or subtraction of capacitors is not positively coupled with the capacitor voltage setting and requires extremely complicated handling, often making it necessary to open the machine.

Therefore, known stud welding machines are disadvantageous in that the capacitance and the charging voltage of the capacitor bank cannot be controlled easily when setting the welding energy for a certain size of an element to be welded by means of one operating element.

An object of this invention is to eliminate these disadvantages, including the previously mentioned operating errors occurring during the setting operation.

SUMMARY OF THE INVENTION

According to a feature of this invention, the above objects, among others, are accomplished by setting the basic capacitor voltage and capacitance values concurrently in a single operation, the basic values being predetermined and positively correlated with the respective element being welded. This makes it possible for an operator of a stud welding machine simultaneously to select, with a single setting member, both the best capacitor voltage and capacitance for the primary factor, and for the respective welding cross-section of the element to be welded.

The operator, thus, no longer has to rely on operating instructions or his own personal touch. He merely has to select the right one from a small number of setting members provided, such as buttons, in accordance with the lettering provided thereon, such as "M8" for welding bolts with an M8 thread.

According to a further feature of this invention, the basic capacitor voltage and capacitance values set by one operation can be increased or decreased by a predetermined amount by additional setting means. Generally, for a welding operation, it will be sufficient to set only the basic capacitor voltage and capacitance values correlated with a bolt to be welded according to the cross-sectional area of its flange. Should the setting of the basic capacitor voltage and capacitance values lead to unsatisfactory welding results, for instance, due to the above-mentioned secondary factors, the basic capacitor voltage and capacitance values can be modified. Minor modifications of the chosen basic values are available from the supplemental or additional operations. This precludes significant operating errors.

According to another feature of the invention, where buttons for setting the basic capacitor voltage and capacitance values are provided, two supplemental or additional setting members such as supplemental or additional push buttons are provided for each of these buttons. By means of these buttons, the set basic values can be correspondingly increased or decreased by a predetermined amount.

According to a preferred embodiment of this invention, the additional setting members may serve only to change the basic capacitor voltage value set by means of a selector, such as a button.

According to yet another feature of the invention, with every possible setting of the basic capacitor voltage and capacitance values, the system correlates a predetermined amount by which the capacitor voltage and/or capacitance may be increased or decreased by an additional setting operation. In order to optimally account for secondary controlling factors, different increases or decreases of the basic capacitor voltage and capacitance values will be required for the secondary factors for each setting of these values, the increase or decrease not necessarily being proportional to the basic values. According to a feature of this invention, there is provided with the setting of specific pairs of basic values, a single additional setting operation which can change these basic capacitor voltage and capacitance values by preset amounts correlated with the actual basic value settings. This relieves an operator of the responsibility of determining how to consider respective basic values in any supplemental or additional value changing operations.

For example, if only a single change is provided for either increasing or decreasing the basic capacitor voltage and capacitance values, these values can be achieved by means of one additional or supplemental selector each. Such a selector may be an additional push button. In this case, a total of two supplemental or additional selector push buttons is sufficient because, in selecting a pair of basic values, the amount of possible increase or decrease is automatically preselected. However, the invention also provides only one or, if applicable, more than two different value changes. The corresponding number of supplemental buttons are provided to increase or decrease the basic capacitor voltage and capacitance values.

According to another feature of the invention, return to the original setting after a trial increase or decrease of the basic values is made possible by providing, in addition to the first supplemental selector buttons, an additional selector by means of which the increase or decrease of the same basic value can be cancelled out.

According to a preferred embodiment of the invention, an actuating operation for setting the basic capacitor voltage and capacitance values cancels the basic values set by the previous actuating operation as well as any increase or decrease of these values achieved by a previous supplemental actuating operation. To achieve this, several push buttons are used to set basic capacitor voltages and capacitance values, each push button being correlated with one specific welding cross-section of welding elements. Supplemental push buttons increase or decrease the basic capacitor voltage and/or capacitance values. These supplemental push buttons may be arranged separately or in series.

According to the invention, these push buttons are coupled to each other so that if one button for setting a basic value is pushed, not only is a basic value button pushed earlier reset to its non-operative position by using a reversing switch, but a previously actuated button for increasing or decreasing the basic values is also reset to its non-operative position. This is accomplished by interconnecting the switching apparatus so that only one set of basic values can be chosen at one time. All other values are decoupled.

When an operator starts a new program by pushing a button to set the basic values, the previously pushed button for another basic pair of values as well as the button for increasing or decreasing the basic values is released so that the values are no longer operative. This prevents the next welding operation from considering the wrong secondary influencing factors in applying the wrong voltage thereby. Rather, the setting to account for the secondary operating factors must be accomplished by positively setting a button after each new setting of a pair of basic values. This process forces the purposeful and positive consideration of the above-mentioned secondary influencing factors, an operation that can readily be learned so that operation mistakes can be avoided.

DETAILED DESCRIPTION OF THE DRAWINGS

Figure 1:
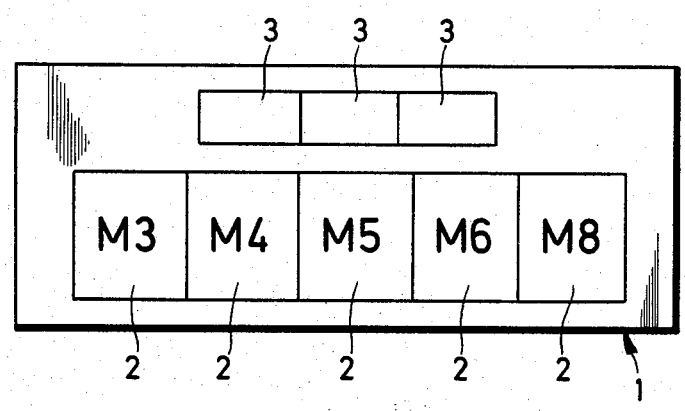
FIG. 1 is a front view of a panel of a bolt welding machine arranged in accordance with the principles of this invention.

In FIG. 1, an operating panel 1 of a bolt welding machine sets the capacitor voltage and capacitance value. Provided in the lower portion of the operating panel 1 are five buttons 2 to set the basic capacitor voltage and capacitance values, considering the primary controlling factor, which is the welding cross-section. The buttons are lettered with the thread size of the welding bolt, which, for instance is M3 to M8. By pushing one of these buttons 2, the basic capacitor voltage and capacitance values which are coordinated with the respective thread size are set concurrently. At the same time, a previously pushed button 2 moves out of engagement, as will be described hereinafter, so that only the presently set button will cause the basic values chosen to be selected.

Still in FIG. 1, there are provided three buttons 3, each of the buttons being indicated as "low," "medium" or "high," respectively. When using the medium or high buttons, the capacitance value and voltage values will be higher than that for the low button setting.

The following Table lists an example of the values for capacitor capacitance and capacitor voltage V for each possible actuation of the buttons 2 and 3. The uppermost horizontal line of the Table indicates the possible settings to take into account the primary controlling factors, which is the thread size of the welding bolts. The two lines below this show the respective sizes of the flange crosssectional area and welding cross-sectional area of the bolts having threads M3 to M8. The line "Medium" lists successive non-dimensional ratios for the normal basic capacitor voltage and capacitance values for each welding bolt size M8 to M8. It is clear that both values of the pair of basic values becomes greater with each next welding bolt size. For considering the secondary factors, i. e. the secondary controlling factors, the line "High" lists the partially increased non-dimensional ratios of the basic capacitor voltage and capacitance values. Similarly, the line "low" lists the non-dimensional ratios of the basic capacitor voltage and capacitance values, somewhat reduced to consider the secondary factors. It is also seen from the Table, that in some cases, only the capacitor voltage, but not its capacity is changed by actuating the buttons 3.

TABLE

| | Basic Selection (Size) | for nondimensional ratios corresponding to the values for the capacitor voltage (V) and its capacity (C) | | | | | | | | |
|---|---|---|---|---|---|---|---|---|---|---|
| | | M3 | | M4 | | M5 | | M6 | | M8 |
| Primary factors | Flange-Diameter (mm) | 5.0 | | 6.0 | | 7.1 | | 8.0 | | 10.0 |
| | Cross-sectional Welding Area (mm2) | 20 | | 28 | | 40 | | 50 | | 80 |
| | Voltage = V | | | | | | | | | |
| Secondary factors | Capacitance=C | C | V | C | V | C | V | C | V | C | V |
| | High | 35 | 141 | 40 | 153 | 50 | 175 | 60 | 172 | 60 | 200 |
| | Medium | 30 | 130 | 35 | 140 | 45 | 163 | 55 | 170 | 60 | 185 |
| | Low | 30 | 112 | 35 | 125 | 40 | 138 | 50 | 158 | 60 | 175 |

According to another embodiment of the invention, contact switches or other selectors and switching means commensurate with the state of the art, are used instead of push buttons. To achieve the above-mentioned connections and coordination of the values of the capacitor voltage and capacitances, generally known relay, transistor or other solid circuitry is employed.

According to still another embodiment of the invention, a reversing switch, upon the actuation of a button for an increase or decrease in the basic values, releases a previously pushed button that increases or decreases the basic values from its operative positive position so that the previously pushed button returns to a nonoperative position. Two push buttons are used for increasing or decreasing the pairs of basic values, and additionally, a third button permits an increase or decrease of the basic values to be cancelled out.

Another embodiment of the invention provides an alternate technique for adjusting the capacitance values. There may be provided a base capacitance and several supplemental capacitances are added to the base capacitance, the values being arranged so that they can be used both for setting the basic value of the capacitor's capacitance as well as for increasing and decreasing the basic values by one supplemental actuating operation each. Therefore, the least possible number of capacitors can be used to require minimum space for the capacitor bank, and additionally, the expense can be kept at a minimum. In one example, the base capacitance is 50 percent of the maximum capacitance of the capacitor bank and additional capacitances of 30 percent and two 10 percent capacitances each relative to the maximum capacitance of the capacitor bank are used. with capacitors thus staggered, it is possible, for example, to graduate the capacitance values for both the basic values as well as their increase or decrease and have these graduations fine enough to obtain excellent welding results for welding bolts having M3 and M8 threads and flange diameters from 4 mm to 10 mm.

Some models of capacitor discharge or bolt or stud welding machines recharge the capacitor banking automatically after every welding operation. Actuating a setting member in the above described manner, due to which the charge of a capacitor or of a part of the capacitors must be increased, presents no technical difficulties because the energy required therefor is available from the power source and recharging can thus be accomplished with the same means as the charge itself, if desired.

If, however, a decrease of the charge of the capacitor bank or of a part of the capacitors becomes necessary due to such actuation, the new, lower adjusted values can be attained only with the next new charge because, basically such welding machines usually have no elements for power output reduction in the capacitor bank. This means, for example, that when adjusting the lower values, the next welding operation is still performed at the old, higher values.

Another embodiment of the invention eliminates this disadvantage by providing a switch which discharges the capacitor bank and also leads to its being recharged so that welding can always be performed immediately with the settings selected. The welding operation can only be initiated after attaining the capacitor voltage and capacitance values set by the actuating operations, and, if desirable, by the supplemental or additional actuation operations.

Figure 2:
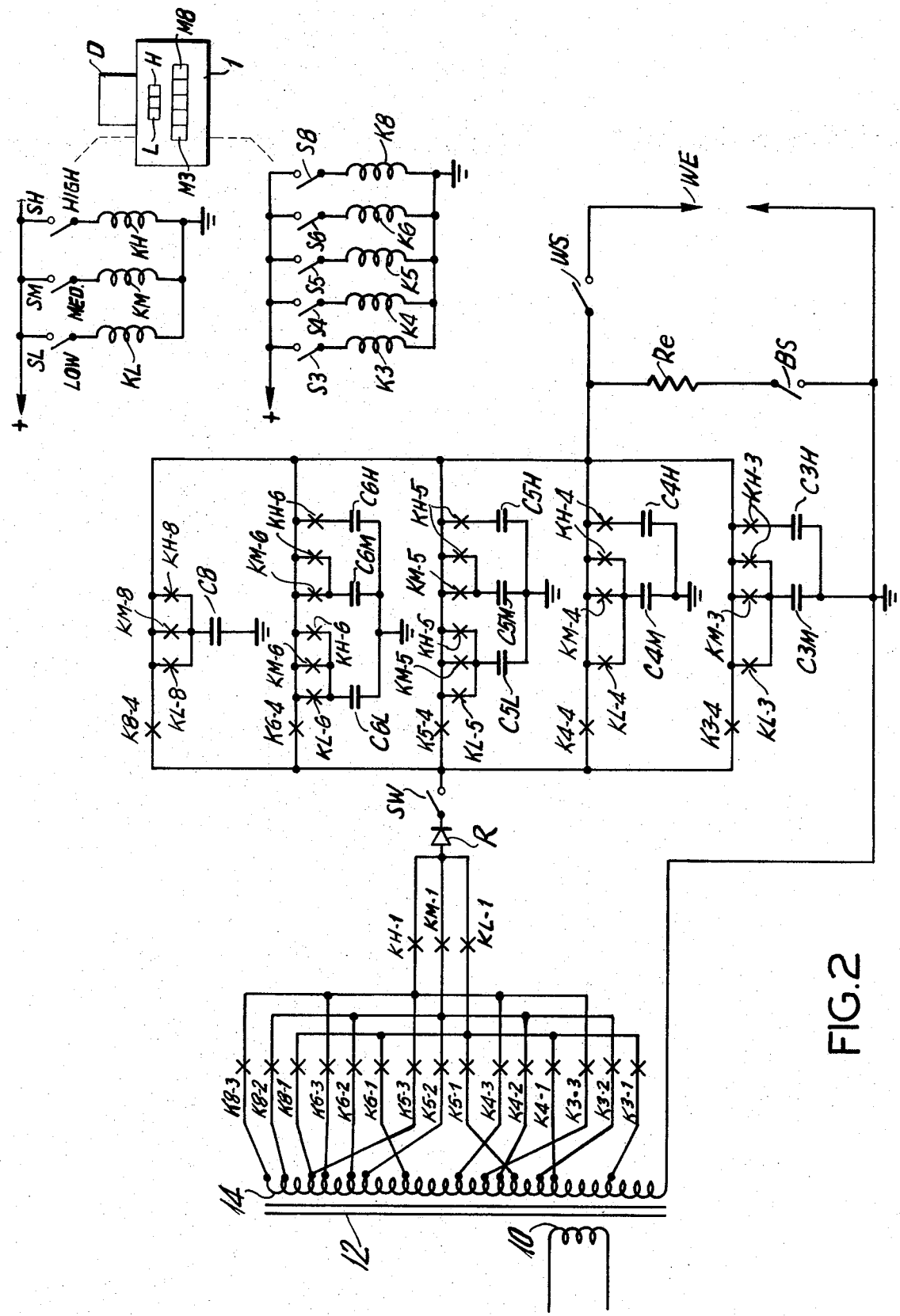
FIG. 2 is a schematic diagram illustrating a stud welding system embodying features of this invention.

FIG. 2 is a circuit diagram of a welding system embodying the invention. Here, the push buttons M3 to M8 of the panel 1 respectively operate switches S3 to S8 while the push buttons low, medium and high respectively operate switches SL, SM and SH. A disconnect arrangement D responds to operation of any of the push buttons M3 to M8 by allowing the corresponding switch S3 to S8 to operate but to disconnect the remaining switches S3 to S8 and SL to SH. At the same time the disconnect arrangement D responds to operation of any of the push buttons low, medium or high to allow connection of the corresponding switch SL to SH but to disconnect the remainder of the switches SL to SH.

Operation of any of the switches S3 to S8 and SL to SH causes energization of a corresponding relay coil K3 to K8 and KL to KH. This energization of any one of the relays coils causes the normally opened contacts having corresponding prefixes to close. Thus, operation of the switch S6 causes the relay coil K6 to be energized and in turn close the contacts K6-1, K6-2, K6-3, and K6-4. FIG. 2 uses the so-called detached contact arrangement. Each contact is indicated by an X crossing the line which it opens. The X indicates that the contact is normally open and closes only when the corresponding relay is energized. A normally closed contact would be indicated by a bar crossing the line.

Similarly, a relay such as K4, when energized, closes all of the contacts designated with the prefix K4, namely contacts K4-1, K4-2, K4-3, and K4-4, while energization of a relay coil such as KM closes each of the contacts beginning with the letters KM, namely contacts KM-1, KM-3, KM-4, KM-5, KM-6, and KM-8. The fact that the contacts are shown schematically separated from the relay coil is not necessarily indicative of the actual placement of the contacts relative to the coils in a physical sense.

In this circuit a source of alternating current energizes the primary winding 10 of a transformer 12 whose secondary 14 is tapped. Each of the taps connected to the respective contacts K3-2 to K8-2 taps off a voltage corresponding to the normal voltage for the particular stud sizes M3 to M8 . Similarly, each of the contacts K3-1 to K8-1 taps off the voltage corresponding to the low for the sizes M3 to M8 respectively. Also, the contacts K3-3 to K8-3 each tap off the voltage corresponding to the high for the sizes of M3 to M8. Thus, when any one of the relays such as K6 is energized the low, normal and high voltages of the size corresponding to M6 is connected to contact KH-1, KM-1 and KL-1.

Energization of one of the relays such as KH causes the contacts KH-1 to apply the voltage at K6-3 to the parallel set of capacitors C6L, C6M and C6H through the now closed contacts K6-4 and one of the set of three closed contacts KH-6. The three capacitors C6L, C6M, and C6H together form the high capacitor. During the welding operation a welding switch WS discharges the charge capacitor through welding electrodes WE. A rectifier R rectifies the current charging the capacitors and a switch SW actuated with the switch WS prevents operation of the switch SW from short-circuiting the secondary winding 14.

As can be seen from FIG. 2, operation of one coil winding K3 to K8 and one coil winding KL to KH selects one voltage and one specific capacitance for each charging operation. The values of the voltages tapped off correspond to the voltages in the table above. Specifically, the voltage at contact K3-1 is 112 volts, at K3-2 130 volts, at K3-3 141 volts, at K4-1 125 volts, at K4-2 140 volts, at K2-3 153 volts, at K5-1 138 volts, at K5-2 163 volts, at K5-3 175 volts, at K6-1 158 volts, at K6-2 170 volts, at K6-3 172 volts, at K8-1 175 volts, at K8-1 185 volts, and at K8-3 200 volts.

The ratios of the capacitances are as follows:

| | | | |
|---|---|---|---|
| C3M | 30 | C | |
| C3H | 5 | C | (to form 35 C with C3M) |
| C4M | 35 | C | |
| C4H | 5 | C | (to form 40 C with C4M) |
| C5L | 40 | C | |
| C5M | 5 | C | (to form 45 C with C5L) |
| C5H | 5 | C | (to form 50 C with C5L and C5M) |
| C6L | 50 | C | |
| C6M | 5 | C | (to form 55 C with C6L) |
| C6M | 5 | C | (to form 60 C with C6L and C6M) |
| C8 | 60 | C | |

The circuit of FIG. 2 represents one embodiment for the high, low, and medium button configurations. The high and low buttons can serve to increase and decrease the medium capacitor voltage and capacitance values set by means of a button 2 as a variation from a basic medium value. The medium button 3 can serve merely the purpose of having an already pushed high or low button 3 return to its rest position if a previously made selection needs correction. That is to say, the switch SM can be normally closed so as to energize the relay KM and become open only when the switches SL and SH are closed. If the high button is pushed with one of the buttons 2 depressed, either one or both of the basic capacitor voltage or capacitance values set by the button 2 may be increased. Conversely, these values can be reduced by a predetermined amount by pushing the low button 3.

With each button, there are coordinated electrical controls and/or switches which assume one operating position when the button is depressed and another operating position when the button is in its rest position. The control of the switches sets the basic capacitor voltage and capacitor values corresponding to the respective depressed buttons or they increase these values in accordance with the respectively depressed high, low, and medium button. Mechanical, electrical, or control switches may also be used.

As a result, the base capacitor and several supplemental capacitors which can be added to the base capacitor set the capacitance. The values of the supplemental capacitors are staggered so that they can be used for setting the basic capacitor capacitance values as well as increasing or decreasing these basic values by a single supplemental actuating operation for each.

Figure 3:
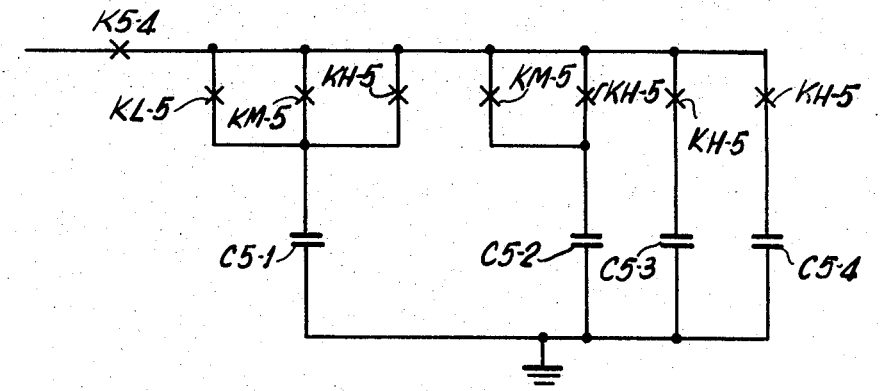
FIGS. 3 and 4 are schematic diagrams of variations of portions of the circuit in FIG. 1, which variations cause the system of FIG. 1 to further embody the invention.

A circuit with one set of capacitances and its respective connections is shown in FIG. 3. This set is representative of each of the sets, C3 to C8. For simplicity the capacitances are prefixed with the characters C5. The values are such that the base capacitance of the entire set is 50 percent of the maximum capacitance. Each of the added capacitances has a value of 30 percent of the maximum capacitance, 10 percent of the maximum capacitance, or 10 percent of the maximum capacitance.

The switches SW and WS of FIG. 2 are arranged so that one is opened while the other is closed. In this way, discharge of the capacitance can take place only when the switch SW is open and charge of the capacitances can take place only when the switch WS is closed.

Figure 4:
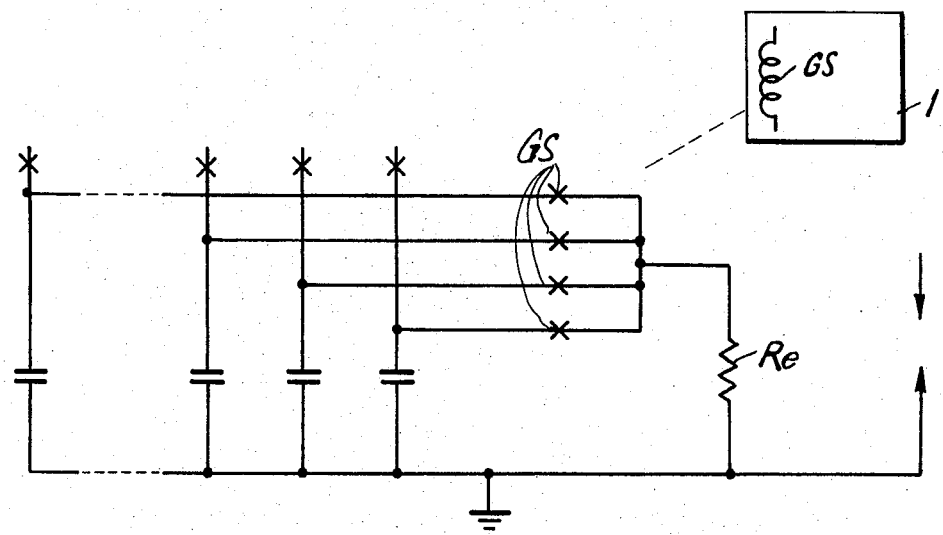

In FIG. 2, a bleeder resistor Re discharges the capacitors each time a button is pushed. This accomplished with a bleeder switch BS which is connected mechanically to each of the buttons. As each button is actuated it closes the switch BS. The latter springs back open after a predetermined period of time before the specific button has an opportunity to energize its particular relay winding. Another embodiment of this discharge system is shown in FIG. 4. Here, a group of capacitances representing all of the capacitances in the system has each of its capacitances connected through ganged switches GS to the resistor Re that discharges the capacitances momentarily. The ganged switches GS are timed spring switches which close only for a short period of time in response to actuation of any one of the buttons. The switches GS and the resistor Re are used in FIG. 4 in lieu of the switch BS and the resistor Re shown in FIG. 2. They are connected respectively to each one of the capacitances in FIG. 2.

According to another embodiment of the invention, the desired capacitances for the low, medium, and high values of the sizes M3 to M8 are selected, by providing a single base capacitor or capacitor bank for the lowest value, such as 30, of all the fifteen possible capacitance combinations. A number of supplemental capacitors with values such as 5 each are provided. The relay contacts K3 to K8 and KL to KH then add the individual capacitors in parallel so that at any time the total capacitance for any predetermined combination of low, medium, high and M3 to M8 is obtained. In each case the lowest value such as 30 is used as a starting capacitance and the other capacitances are added as needed. This results in a saving in the number of capacitors used.

While specific embodiments of the invention have been shown and described in detail to illustrate the application of the inventive principles, it will be understood that the invention may be embodied otherwise without departing from such principles.

What is claimed is:

1. An electrical stud welding apparatus for use with bolts having different cross-section bolt welding areas, comprising capacitor means variable in capacitance value, voltage means variable in voltage for applying a voltage across said capacitor means, discharge means for discharging said capacitor means through the welding area, switch means having a plurality of manually actuable switches each correlated to one of a plurality of normal operating capacitance charging voltages in said voltage means and capacitance values in said capacitor means, said switch means being coupled to said voltage means and said capacitor means for simultaneously selecting a single capacitance charging voltage and a single capacitance value for each of said switches, each of said charging voltages and capacitance values being appropriate to a selected cross sectional area of a bolt to be welded, the selection of each of the selected one of the plurality of charging voltages and each of the selected ones of the capacitance values being settable simultaneously by a single one of said switches.

2. An apparatus as in claim 1, wherein said switch means includes a second set of manually operable switches connected to change the capacitance value set by the first set of switches by a predetermined amount depending upon the one of the first set of switches which has been operated.

3. An apparatus as in claim 2, wherein operation of one of said first switches releases any previously operated switches of said first set and changes the capacitance value and voltage previously selected while setting a new value and voltage.

4. An apparatus as in claim 2, wherein said capacitor means includes a plurality of capacitors for establishing a medium value in response to operation of said first set of switches, and wherein said capacitor means includes supplemental capacitors operable in response to said second set of switches for varying the capacitance value selected by said switching means in response to operation of said first set of switches.

5. An apparatus as in claim 4, wherein said switching means connects said capacitor means in response to operation of any one of said first set of switches so that the lowest capacitance is approximately 50 percent of the maximum capacitance and the supplemental capacitances are each equal approximately to 30, 10, and again 10 percent of the maximum capacitance.

6. An apparatus as in claim 1, wherein said switch means includes a second set of switches arranged to change the voltage in said voltage means by predetermined amounts depending upon which switches in said first and second set of switches have been actuated.

7. An apparatus as in claim 6, wherein operation of one of said first switches releases any previously operated switches of said first set and releases the capacitance value and voltage previously selected while setting the new value and voltage.

8. An apparatus as in claim 1, wherein said switch means includes a second set of switches arranged for causing said voltage and said capacitance value to depart from the voltage and value set by one of said first set of switches by a predetermined amount depending upon which of said switches in said first and said second set have been actuated.

9. An apparatus as in claim 8, wherein operation of one of said first switches releases any previously operated switches of said first set and releases the capacitance value and voltage previously selected while setting the new value and voltage.

10. An apparatus as in claim 8, wherein said capacitor means includes a plurality of capacitors for establishing a medium value in response to operation of said first set of switches and wherein said capacitor means includes supplemental capacitors operable in response to said second set of switches for changing the capacitance selected by said switching means in response to operation of said first set of switches.

11. An apparatus as in claim 10, wherein said switching means connects said capacitor means in response to operation of any one of said first set of switches so that the lowest capacitance is approximately 50 percent of the maximum capacitance and the supplemental capacitances are each equal approximately to 30, 10, and again 10 percent of the maximum capacitance.

12. An apparatus as in claim 1, wherein said discharge means includes means for permitting discharge only after said capacitor voltage and capacitance value set by said switching means have been attained.

13. An apparatus as in claim 1, wherein said switching means includes means responsive to actuation of one of said switches for discharging said capacitor means.

14. The method of electrical discharge stud welding which comprises selecting a voltage from one of a plurality of voltages at a source and a capacitance value from one of a plurality of capacitance values at capacitor means with a single switch and connecting the selected voltage from the voltage source to the selected capacitor means, and conductively applying said voltage capacitor means across members to be welded, the step of selecting and connecting including actuation of but a single switch and simultaneous connection of the selected capacitance value and voltage.

15. The method as in claim 14, further comprising actuating a second switch defining a general relationship to the first selected voltage and selecting a second voltage which departs from the first voltage by a predetermined degree of departure and simultaneously disconnecting the first voltage.

16. The method as in claim 14, further comprising actuating a second switch defining a general relationship to the selected capacitance so as to select a second capacitance having a predetermined departure from the first capacitance.

17. The method as in claim 14, further comprising operating a second switch defining a general relationship to each of the first switches, said operation selecting a second voltage and a second capacitance having a predermined relationship to the selected ones of said capacitance.

18. The method of electrical discharge stud welding, which comprises setting one of a number of selectable voltages at a voltage source and one of a plurality of capacitance values in capacitance means having variable capacitance values, connecting the source to the capacitance means so as to charge the capacitance means, and discharging the charge of said capacitance means through a stud having predetermined characteristics, said setting step including setting the voltage of the voltage source and the capacitance of the capacitance means to the one of the plurality of voltages and one of the plurality of the capacitance values correlated to the characteristics of the stud, characterized in that the step of setting the voltage source to the one of the plurality of voltages and the capacitance means to one of the plurality of capacitance values includes actuating only a single switch which in turn simultaneously sets the voltage source to the one of the plurality of voltages and the capacitance means to the one of plurality of capacitance values.

19. An electrical stud welding apparatus for use with bolts having different cross-sectional bolt welding areas, comprising variable capacitance capacitor means, variable voltage means for producing voltages of variable value, discharge means for discharging said capacitor means through the welding area, switch means coupling said voltage means to said capacitor means for charging said capacitor means, said switch means including first varying means for varying the voltage to one of a plurality of voltages, said switch means including second varying means for varying the capacitance of said capacitance means to one of a plurality of capacitances, and a plurality of individually operable manual switches coupled to each of said first varying means and said second varying means and each selecting one voltage with said first varying means and one capacitance value with said second varying means simultaneously in accordance with the bolt welding area to be welded in response to operation of one of the switches in said switching means.

20. An apparatus as in claim 19, wherein said first and second varying means each includes a plurality of switch contacts for selecting incremental voltages and capacitances.

* * * * *